United States Patent Office 2,823,202
Patented Feb. 11, 1958

2,823,202
PREPARATION OF MONOCHLOROAZOBENZENES

Jack H. Thelin, Somerville, and Herman Cherlow, North Plainfield, N. J., assignors to American Cyanamid Company, New York, N. Y., a corporation of Maine No Drawing. Application June 18, 1954
Serial No. 437,851

4 Claims. (Cl. 260—205)

This invention relates to an improved process of preparing monochloroazobenzenes which are useful intermediates for the preparation of dyestuffs and other chemicals such as insecticides, pesticides and the like, as well as being useful pigments for oils, lacquers, plastics, etc.

4-chloroazobenzene has been prepared by the Sandmeyer reaction involving reacting p-aminoazobenzene with nitrous acid and thereafter replacing the diazonium group by chlorine by reaction with cuprous chloride. While this preparative method is satisfactory for laboratory preparations, it is not entirely feasible because of economic reasons for large-scale plant operations.

In accordance with the present invention, we have discovered that the three isomeric monochloroazobenzenes can be prepared by the reaction of aniline with, respectively, o-, m- or p-nitrochlorobenzene in the presence of caustic at a reaction temperature of about 160–185° C. The two-, three- or four-position isomer will be produced depending, of course, upon the choice of the isomeric chloro substituted nitrobenzene used.

The quantity of aniline used in relation to the monochloronitrobenzene should be at least stoichiometric. Excess aniline does no harm and, in fact, is desirable as a diluent for the reaction. Also, the excess aniline is easily recoverable.

The quantity of caustic used in the reaction is a matter of some importance. The ratio of caustic to nitrochlorobenzene should be at least stoichiometric and may be present to the extent of about 6 moles of caustic per mole of nitrochlorobenzene. Above about 6 molar equivalents of caustic the usage becomes uneconomical since the caustic is not recoverable.

Any suitable alkali metal hydroxide such as sodium, potassium, lithium hydroxides, etc., may be used in the reaction.

The invention will be described in greater detail in conjunction with the following specific examples in which the parts are by weight unless otherwise specified.

Example 1

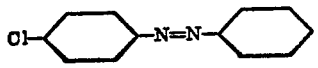

A mixture of 100 parts of 4-nitrochlorobenzene, 412 parts of aniline, and 32 parts of sodium hydroxide is stirred and heated to 160° C. At this temperature the first evolution of water is observed. The reaction mass is stirred at 160–185° C. until the reaction is substantially complete. When the mixture has cooled to 80° C., it is diluted with warm water. The mixture is allowed to separate into two layers and the aqueous layer is separated. The residual oil is fractionated under reduced pressure. After the excess aniline is recovered, the crude product is distilled. The latter is recrystallized from alcohol to give a good yield of the bright orange 4-chloroazobenzene.

Example 2

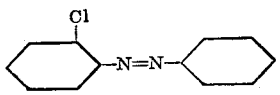

The procedure of Example 1 is followed with the exception that 2-nitrochlorobenzene is used instead of 4-nitrochlorobenzene as in Example 1. A good yield of 2-chloroazobenzene is obtained.

Example 3

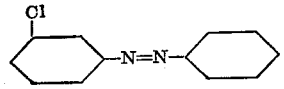

The procedure of Example 1 is followed with the exception that 3-nitrochlorobenzene is used instead of 4-nitrochlorobenzene as in Example 1. A good yield of 3-chloroazobenzene is obtained.

We claim:
1. The process of producing monochloroazobenzene which comprises reacting monochloronitrobenzene with aniline in the presence of an alkali metal hydroxide under anhydrous conditions at a temperature of about 160 to 185° C., the aniline and alkali metal hydroxide being present in at least stoichiometric quantities.
2. The process according to claim 1 in which the monochloroazobenzene produced is 2-chloroazobenzene.
3. The process according to claim 1 in which the monochloroazobenzene produced is 3-chloroazobenzene.
4. The process according to claim 1 in which the monochloroazobenzene produced is 4-chloroazobenzene.

References Cited in the file of this patent
UNITED STATES PATENTS

| 2,109,183 | Roos | Feb. 22, 1938 |
| 2,187,366 | Schulz | Jan. 16, 1940 |
| 2,337,256 | Lewis | Dec. 21, 1943 |